Figure 21:
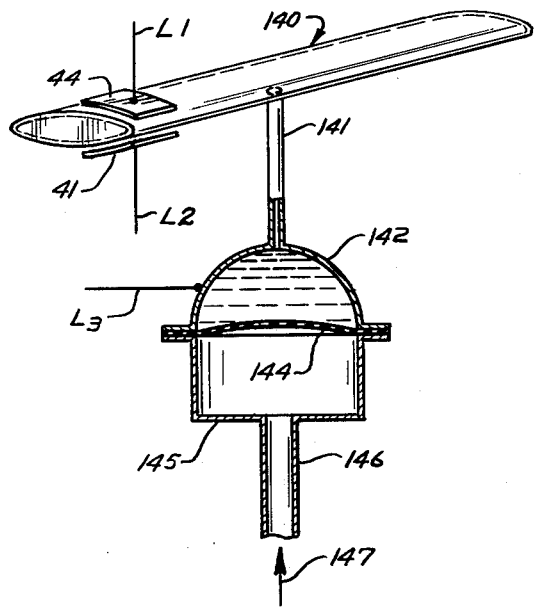

June 28, 1966   R. R. KOOIMAN   3,257,850
PRESSURE RESPONSIVE VIBRATING TUBE
Filed Nov. 26, 1963   8 Sheets-Sheet 1
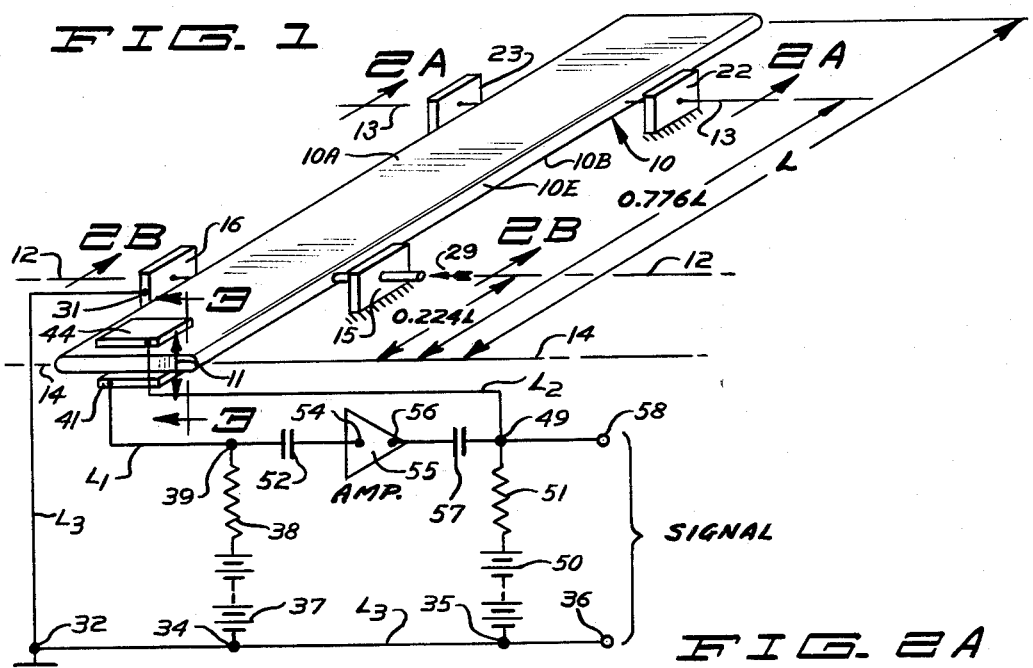
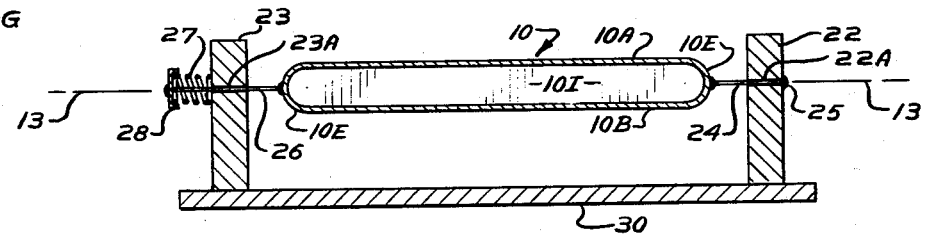
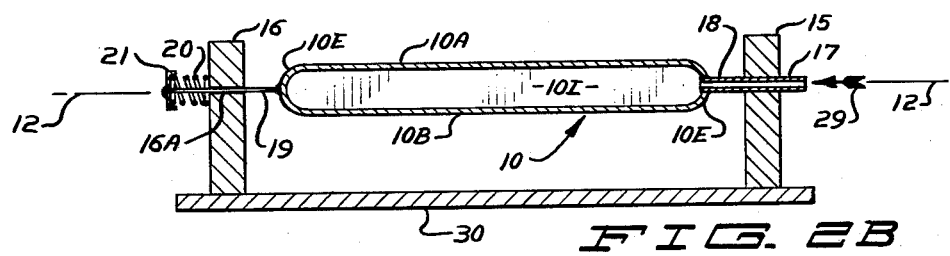
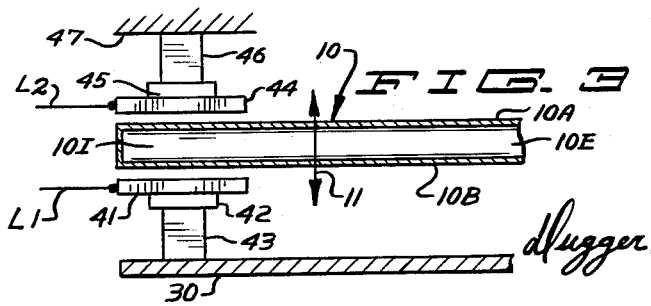
INVENTOR.
ROBERT R. KOOIMAN
BY
*Dugger Broddock Johnson & Westman*
ATTORNEYS

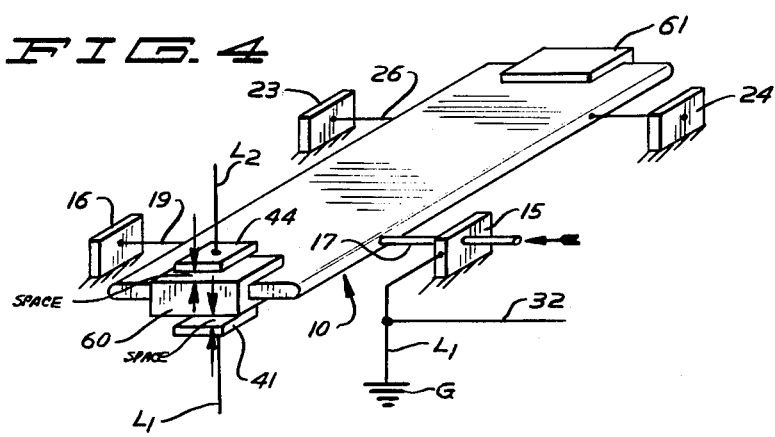
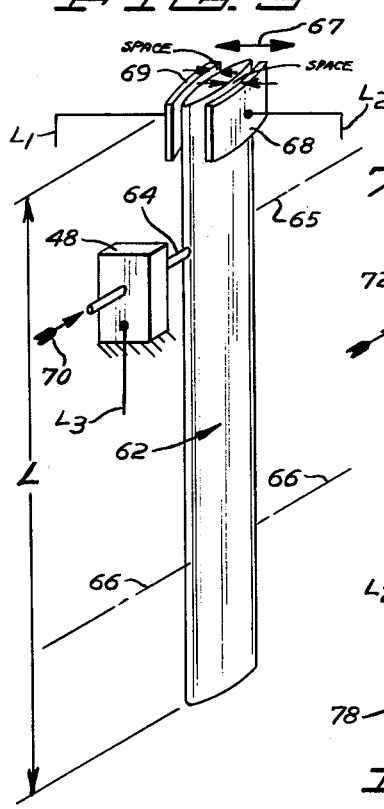
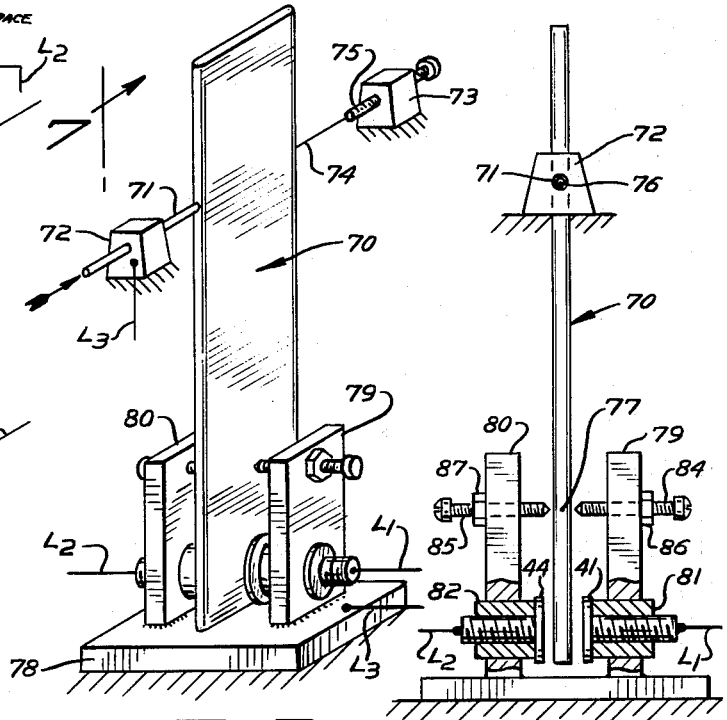
INVENTOR.
ROBERT R. KOOIMAN
BY
ATTORNEYS

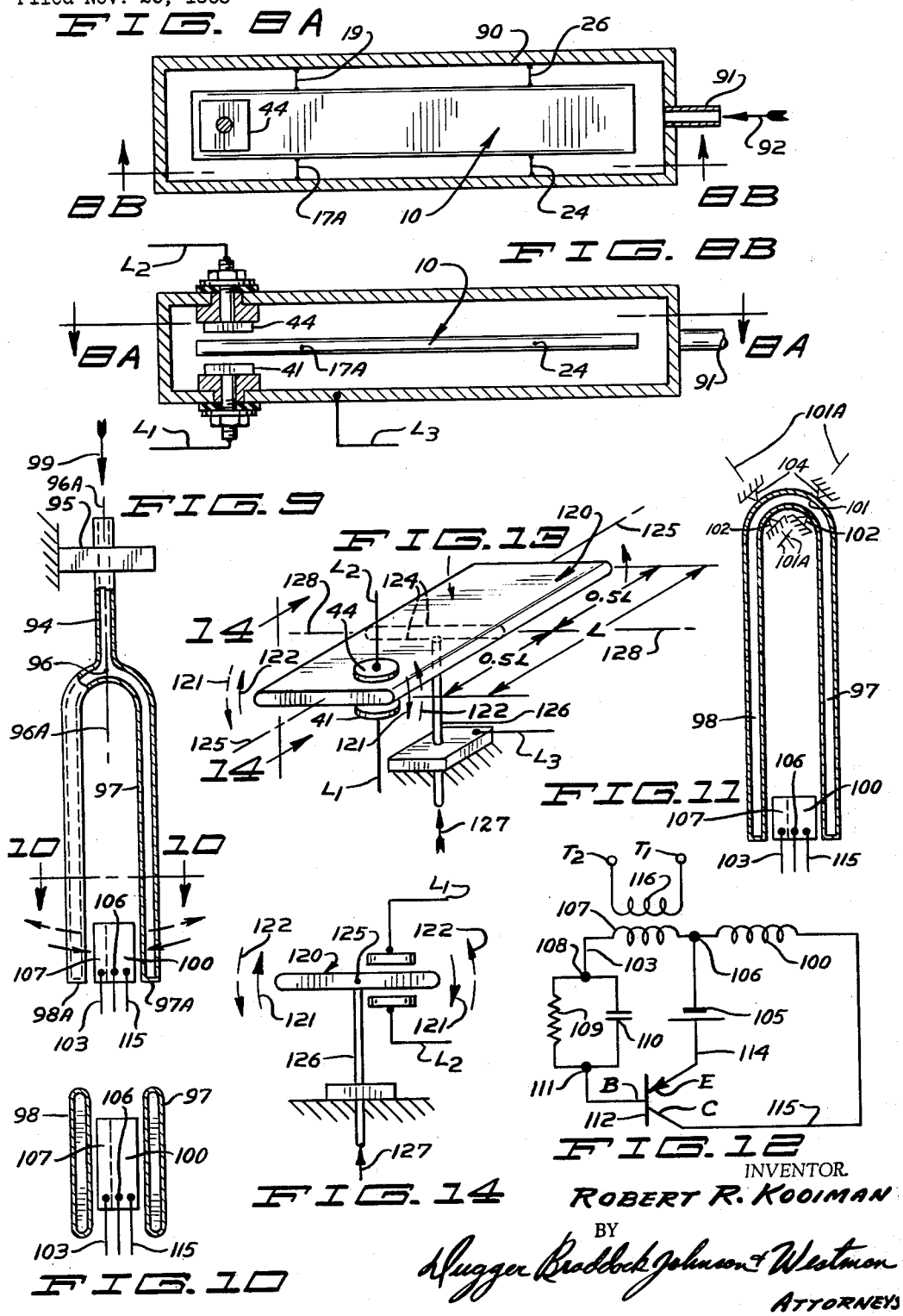

June 28, 1966 R. R. KOOIMAN 3,257,850
PRESSURE RESPONSIVE VIBRATING TUBE
Filed Nov. 26, 1963 8 Sheets-Sheet 4
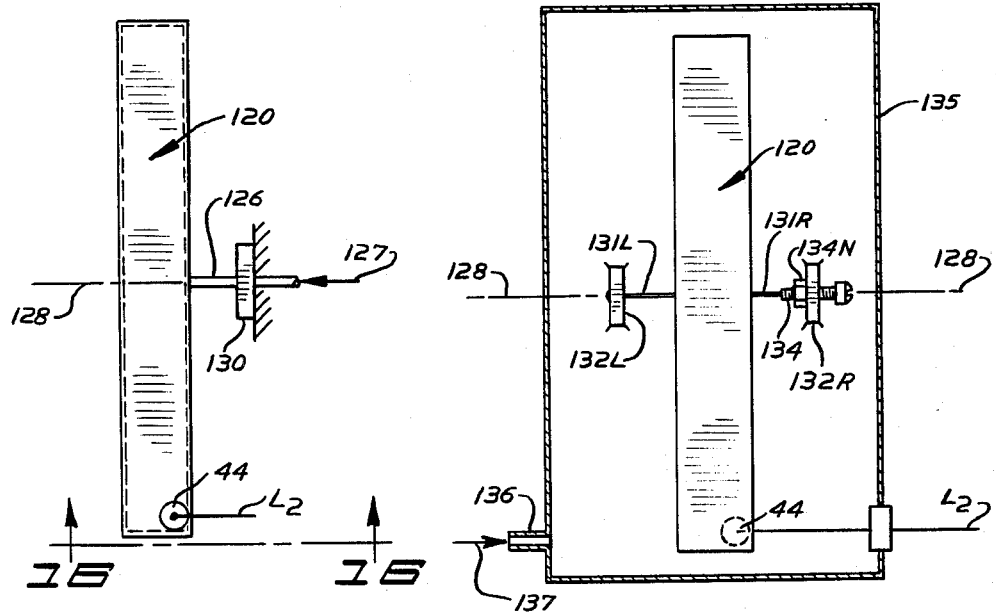
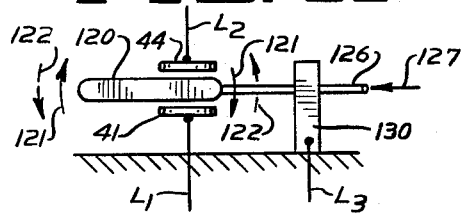
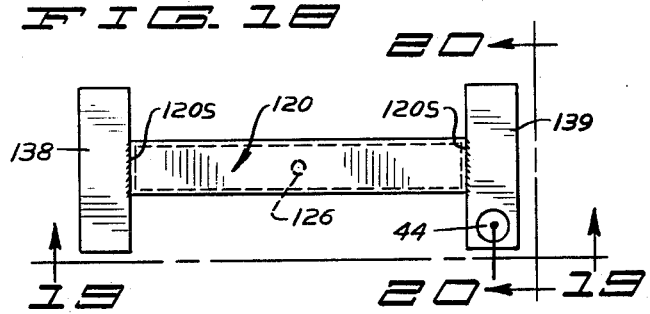
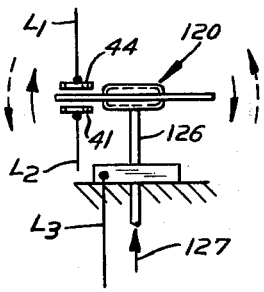
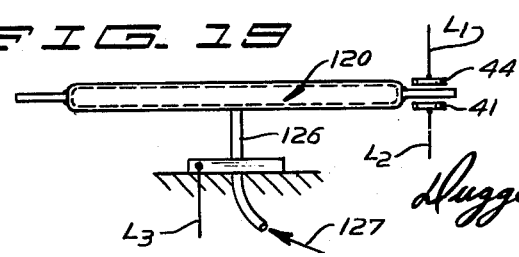
INVENTOR.
ROBERT R. KOOIMAN
BY
ATTORNEYS INVENTOR.
ROBERT R. KOOIMAN
BY
Dugger Braddock Johnson & Westman
ATTORNEYS June 28, 1966 R. R. KOOIMAN 3,257,850
PRESSURE RESPONSIVE VIBRATING TUBE
Filed Nov. 26, 1963 8 Sheets-Sheet 6
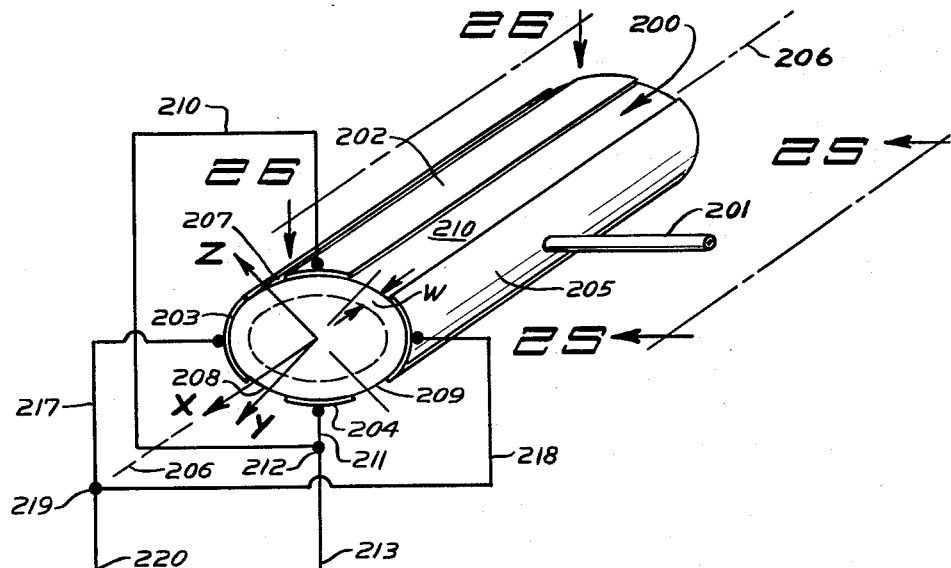
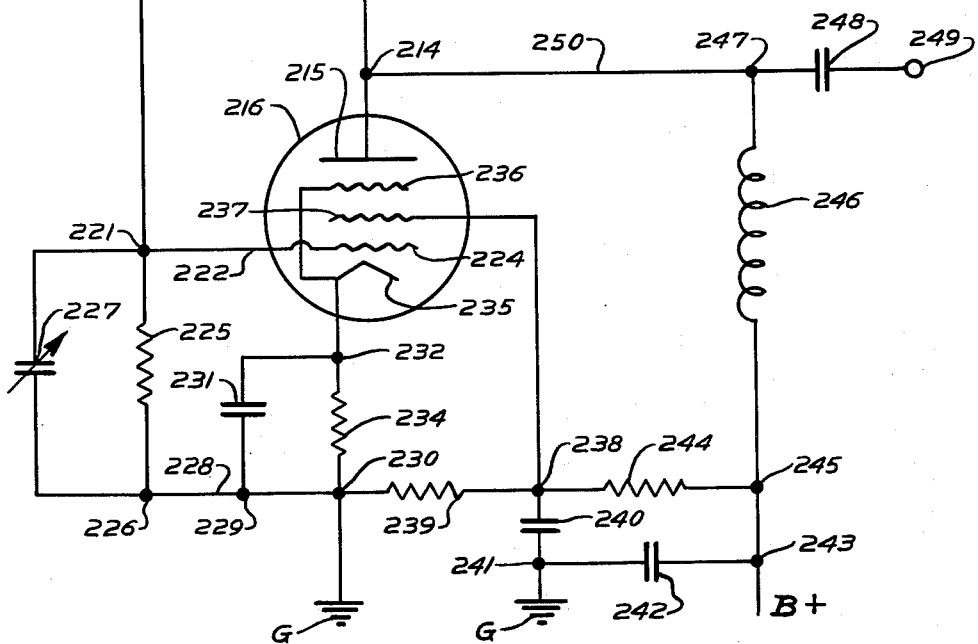
FIG. 24
INVENTOR.
ROBERT R. KOOIMAN
BY
Dugger Braddock Johnson + Westman
ATTORNEYS June 28, 1966 R. R. KOOIMAN 3,257,850
PRESSURE RESPONSIVE VIBRATING TUBE
Filed Nov. 26, 1963 8 Sheets-Sheet 7
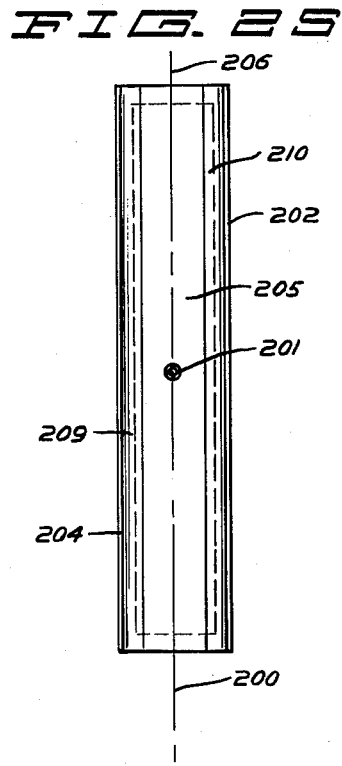
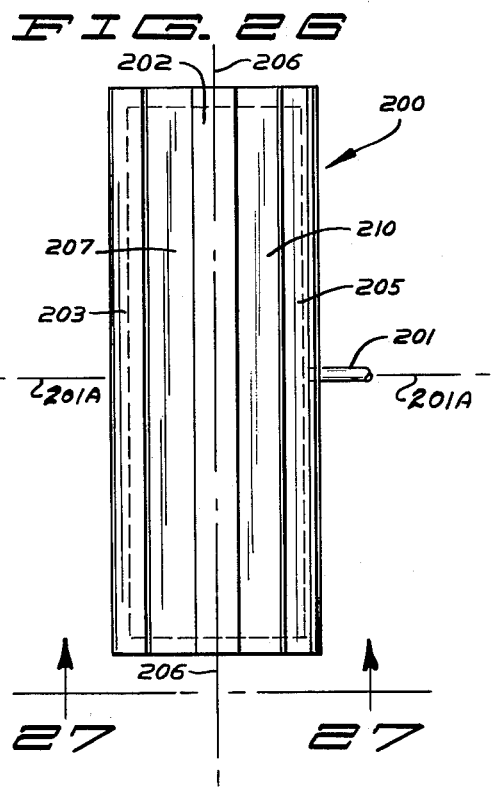
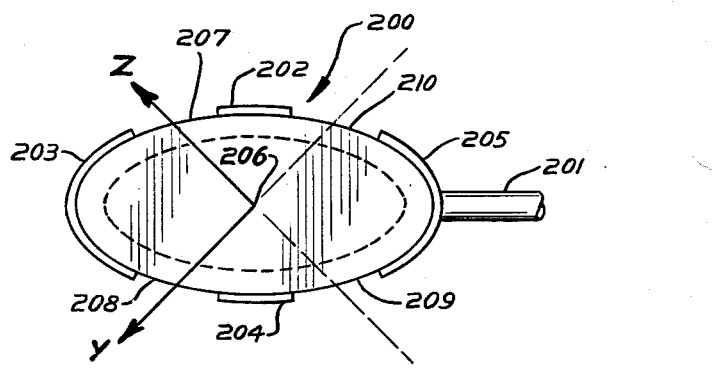
INVENTOR.
ROBERT R. KOOIMAN
BY
ATTORNEYS June 28, 1966 R. R. KOOIMAN 3,257,850
PRESSURE RESPONSIVE VIBRATING TUBE
Filed Nov. 26, 1963 8 Sheets-Sheet 8
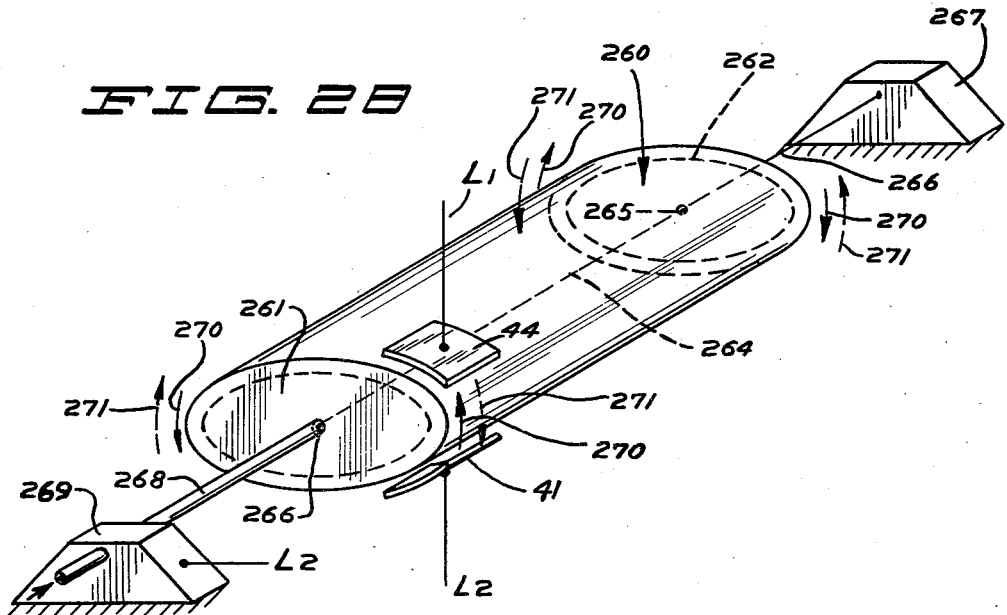
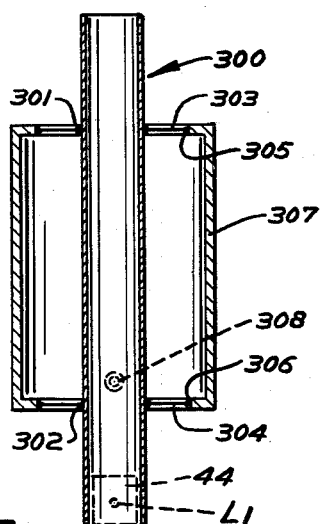
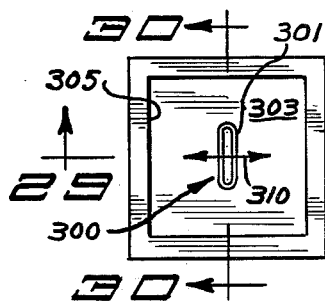
INVENTOR.
ROBERT R. KOOIMAN
BY
Dugger Braddock Johnson + Westman
ATTORNEYS

United States Patent Office 3,257,850
Patented June 28, 1966

3,257,850
PRESSURE RESPONSIVE VIBRATING TUBE
Robert R. Kooiman, Hopkins, Minn., assignor to Rosemount Engineering Company, Minneapolis, Minn., a corporation of Minnesota
Filed Nov. 26, 1963, Ser. No. 326,088
26 Claims. (Cl. 73—398)

This invention relates to pressure responsive vibrating tubes and more specially to instruments, devices and systems wherein a pressure responsive vibrating tube is used as the sensor.

It is known to use a pressure measuring apparatus utilizing a tube of flattened configuration, mounted for vibration. In the known form, the tube is supported from one end and is arranged so as to receive pressure and provision is made for vibrating the tube and for reading the frequency of vibration. In such known device where the tube is supported at one end, energy is absorbed in the end support and although vibration may be forced, the vibration is restrained, and is not satisfactory, especially when accurate readings are desired.

It is an object of the present invention to provide improved pressure responsive vibrating tubes and instruments and systems wherein such tubes are the sensors. It is another object of the invention to provide pressure responsive vibrating tubes for measuring temperature, pressure and frequency. It is a further object of the invention to provide improved pressure responsive vibrating tubes, and mountings therefor and instruments and systems utilizing the same. It is another object of the invention to provide improved pressure vibrating tubes wherein the mounting or mountings are at positions along the tube constituting the node or nodes in respect to the vibration of the tube. It is a further object of the invention to provide an improved pressure responsive vibrating tube having mountings so positioned and proportioned that the energy loss in the system is so minimized to be negligible, and wherein very highly accurate frequency vibration may be sustained. It is also an object of the invention to provide improved pressure responsive vibrating tubes and instruments and systems wherein they are used, wherein the pressure responsive vibrating tube is vibrated torsionally. It is another object of the invention to provide torsionally vibratory pressure responsive vibrating tubes wherein the tube is mounted at a node in respect to the torsional vibration of such tube.

It is another object of the invention to provide pressure responsive vibrating tubes having masses concentrated at certain selected portions of the tube. It is another object of the invention to provide pressure responsive vibrating tubes of varying mountings, shapes and composed of various materials, and provided with various forms of vibration inducing systems and read-out circuits.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 22:
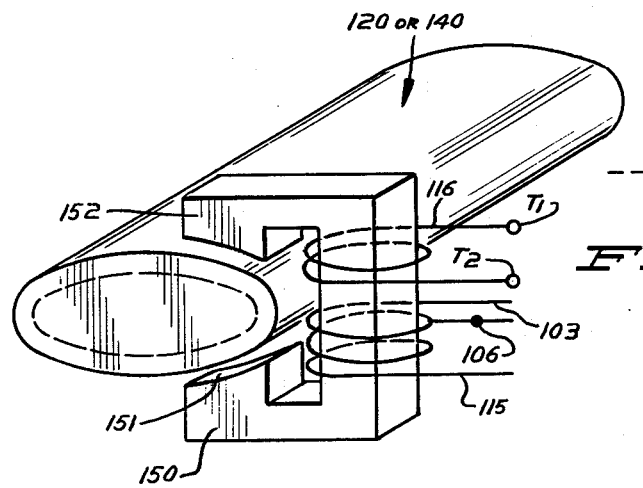
Figure 23C:
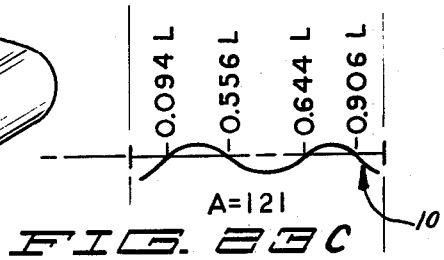
Figure 23D:
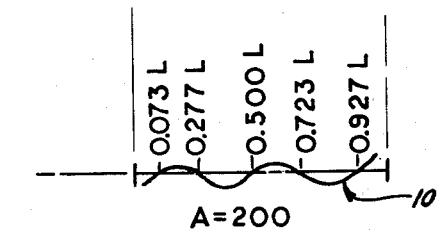

The invention is illustrated with reference to the drawings wherein FIGURE 1 is a schematic view, showing one embodiment of the invention, and in which the vibrating tube is shown isometrically. FIGURE 2A is a sectional view taken along the line and in the direction of arrows 2A—2A, of FIGURE 1. FIGURE 2B is a further sectional view taken along the line and in the direction of arrows 2B—2B of FIGURE 1. FIGURE 3 is an additional sectional view taken along the line and in the direction of arrows 3—3 of FIGURE 1. FIGURE 4 is an isometric view illustrating a further embodiment of the invention. FIGURE 5 is an isometric view illustrating another embodiment of the invention. FIGURE 6 is an isometric view showing another embodiment of the invention. FIGURE 7 is a side elevational view taken in the direction of arrow 7—7 of FIGURE 6, and partly in section showing the embodiment of the invention illustrated in FIGURE 6. FIGURES 8A–8B illustrate another embodiment of the invention, FIGURE 8A being a sectional view taken along the line and in the direction of arrows 8A—8A of FIGURE 8B, and FIGURE 8B being a sectional view taken along the line and in the direction of arrows 8B—8B of FIGURE 8A. FIGURE 9A is a side elevational view illustrating another form of the invention. FIGURE 10 is a sectional view taken along the lines and in the direction of arrows 10—10 of FIGURE 9. FIGURE 11 is a side elevational view of still another embodiment of the invention. FIGURE 12 illustrates a readout circuit which may be used in connection with the embodiment of the invention set forth in FIGURE 11. FIGURES 13 and 14 illustrate still another embodiment of the invention, FIGURE 13 being an isometric view and FIGURE 14 being an end elevational view taken along the line and in the direction of arrows 14—14 of FIGURE 13. FIGURES 15 and 16 illustrate a further embodiment of the invention, FIGURE 15 being a plan view and FIGURE 16 an end elevational view taken in the direction of arrows 16—16 of FIGURE 15. FIGURE 17 is a plan view partly in section, illustrating a further embodiment of the invention. FIGURES 18, 19 and 20 illustrate a further embodiment of the invention, FIGURE 18 being a plan view, FIGURE 19 being a side elevational view taken in the direction of arrows 19—19 of FIGURE 18 and FIGURE 20 an end elevational view taken along the line and in the direction of arrows 20—20 of FIGURE 18. FIGURE 21 is an isometric view partly in section illustrating a further embodiment of the invention. FIGURE 22 is an isometric view illustrating one form of motoring device for vibrating tubes of the present invention. FIGURES 23A, 23B, 23C and 23D are a series of related views illustrating various nodes of vibration of the vibrating tubes of the present invention which may be utilized as mounting positions. FIGURES 24 through 27 illustrate a further embodiment of my invention, FIGURE 24 illustrating the vibrating tube in isometric view and the circuitry schematically. FIGURE 25 is a side elevational view taken in the direction of arrows 25—25 of FIGURE 24, FIGURE 26 being a plan view taken in the direction of arrows 26—26 of FIGURE 24. FIGURE 27 is an end view taken in the direction of arrows 27—27 of FIGURE 25. FIGURE 28 is an isometric view illustrating a further embodiment of the invention. FIGURES 29, 30 and 31 show a further embodiment of the invention, FIGURE 29 being a vertical section taken along the line and in the direction of arrows 29—29 of FIGURE 31; FIGURE 30 being a vertical section taken along the line and in the direction of arrows 30—30 of FIGURE 31, and FIGURE 31 being a plan view taken in the direction of arrows 31—31 of FIGURE 29.

Through the drawings, corresponding numerals refer to the same parts.

In general, the pressure responsive vibrating tubes of the present invention are tubes of non-circular configuration which will exhibit a change in stiffness about at least one of the axes of the cross-section of the longitudinal axis of the tube when subjected to differential pressure on the walls of the tube. Tubes of flat or oval configuration having some flattening may be used. There are many non-circular shapes that are suitable. A tube having flat or curved, proximate side walls and curved edge walls is useful in many instances. In other instances, eliptical or lenticular cross-sectional shapes of tubes may be used. Other forms and shapes are illustrated herein.

According to the present invention, the vibrating tube is so constructed and equipped as to permit application of differential pressure to at least a portion of the wall of the tube. In its simplest form, this is accomplished by closing the ends of the tube and evacuating it or sealing in the tube a quantity of fluid. When then subjected to varying atmospheric pressure, or if placed in a container and subjected to varying pressure or vacuum or if the tube contains a fluid and it is subjected to variation in temperature, a differential pressure will be imposed on the walls of the tube and its stiffness will be varied. In other exemplifications of the invention a pressure connection can be let into the vibrating tube or the tube may be left open at its ends and be provided with a belt-container, enclosing a portion of the tube, for varying the pressure applied thereto. Any of these means can be utilized for applying a differential pressure to the walls of the tube.

The vibratable tube thus provided with means for applying a differential pressure to at least a portion of the walls thereof is then mounted for vibration either transversely which is to say, in a direction normal to a plane through the major axis of the cross-section of the tube, or the tube may be mounted for torsional vibration about the longitudinal axis of the tube. With either form of vibration, transverse or torsional, the attachment of the mounting is, according to the present invention, made to a portion of the tube which will constitute a "node" in respect to the type of vibration induced in the tube.

It is within the purview of the present invention that the tube may be vibrated at its fundamental frequency or at a harmonic of its fundamental frequency, and the location of the node developed with such vibration is used as the location of the mounting or mountings for the tube.

The type of vibratory drive that is used will be dependent upon the materials of which the tube is made, and the frequency of vibration. The drive may be magnetic, capacitative, piezoelectric or magnetostrictive.

According to this invention the interior of the tube may be connected to a pressure source or the tube may be completely sealed and mounted within a container in which the pressure is introduced and thus applied to the exterior of the tube. A sealed quantity of gas may be contained in the tube, as where the device is used as a pressure or frequency standard. Any pure gas may be used as the filling gas. Helium or other rare gases are useful since they remain gaseous at low temperatures. In some instances, the tube may be filled with a fluid, such as an oil filling.

The vibration tubes of the present invention may be composed of metals, metal alloys, or materials such as silicon, germanium or quartz. The use of quartz and silicon and germanium for the vibration tube is desirable, particularly for high accuracies, because of the low energy loss within the material itself. Single crystalline silicon is the preferred material for high frequency requirements because of its extremely low energy loss and relative freedom from ageing as demonstrated in the paper by P. D. Southgate, published in Proc. Phys. Soc. B, vol. 70, page 804–6, August 1957 and U.S. Patent No. 2,998,575.

Other details of the invention will be apparent from the description which follows.

Referring to FIGURES 1–3, the vibrating tube is shown generally at 10, is of "flattened" cross-section. It has flat, or generally flat upper and lower faces 10A and 10B respectively connected by curved edge walls 10E—10E. Both ends of tube 10 are sealed closed, in this embodiment of the invention.

The tube 10 is mounted for transverse vibration in the direction of the double arrow 11, and the mountings are located at lines 12—12 and 13—13 which extend transversely of the tube. These lines 12—12 and 13—13 are in the median plane between the top and bottom surfaces 10A and 10B of the tube. Such median plane will always exist in any tube structure having a cross-section other than circular, and will be the plane through the principal axis of the cross-sectional shape of the tube. Thus, if the tube has a flattened shape such as in FIGURES 1–3, or has a lenticular or eliptical shape, this median plane occurs at the major (longest) axis of the cross-sectional shape. In a flattened tube as in FIGURES 1–2 it is midway from top-to-bottom between the flat sides 10A and 10B as shown in FIGURE 1 at the line 14—14. If the cross section is eliptical the median plane would be through the major axis of the elipse; if the tube is lenticular in cross-section the median plane is likewise through the major axis of the shape. The vibration will occur "transversely," or normal to such median plane. This is the direction of the double arrow 11, in FIGURES 1–3, illustrating the direction of vibration.

If the tube 10 is considered as having a length L and it is vibrated at its fundamental frequency, two "nodes" of such vibrating body will occur along its length. One of these nodes will occur at a position which is a distance 0.224L measured from one end, i.e. as from the line 14—14 and another such node will occur at a position which is 0.776L from such end, L being the length of the tube. These are the two nodes for the vibration of the tube 10 at its fundamental frequency. According to the present invention, the supports for the tube are located at lines extending in the median plane and normal to the length of the tube through these nodes, which in FIGURES 1–3 are the lines 12—12 and 13—13. Accordingly, for the tube 10 there is provided one support at the node-line 12—12 consisting of the brackets 15–16. From bracket 15 there extends, in the direction of line 12—12 a small capillary tube 17, which is fixed to the bracket 15 by means of soldering or the like. This tube extends to and enters through the sidewall 10E and communicates with the interior space 10I of the tube 10. The capillary tube is attached in pressure tight relation to the wall 10E of tube 10 by any suitable connection at 18 (i.e. by soldering or the like). The size of tube 17 is shown greatly exaggerated dimension in FIGURE 2B. It actually need be only a small capillary tube, sufficient to communicate pressure to space 10I. Then, extending along the line 12—12 from the opposite side of the tube 10 there is a fine wire 19 which extends through a snug hole 16A in the bracket 16 and then passes out axially through a spring 20 where it is attached to a cap 21. Before the attachment to the cap is made the cap 21 is pushed down so as to compress the spring 20. The wire 19 is then soldered to the cap 21, and thereafter, spring 20 tensions wire 19 and of course, also tensions tube 17. The wire 19 passes snuggly but freely through the hole 16A and accordingly the spring 20 will tension the wire 19 and tend to pull the tube 10 to the left as shown in FIGURE 2B, against the fastening effect of tube 17. Together, wire 19 and tube 18 form the support at the nodular line 12—12.

As will be illustrated hereinafter, if tube 10 is suspended vertically, no support need be provided at nodular line 13—13, but where tube 10 is supported horizontally, a support is provided at the line 13—13. For support at this nodular line, there are again provided a pair of brackets 22–23 each having a very small hole 22A and 23A therethrough. Through this hole, there passes snuggly but freely a supporting wire 24 at one side which is provided at its outer end with fastening button 25, which prevents it from pulling through the hole. At the other support 23, a wire 26 passes through the spring 27 and is attached to a washer 28 which is pushed down so as to compress the spring 27 before the attachment is made. In this way, the spring 27 tensions the wire 23 and also tensions the wire 24. Together, the wires 24 and 26 provide the support at the nodular line 13—13, when it is desired to provide a support at this node of tube 10.

If desired, the length of these supports (tube 17 plus wires 19 and 24 plus 26) in an axial direction from their point of attachment to the framework to the tube 10, may be such that the period of vibration of the "supports" (i.e. tube 17 plus wires 19; 24 plus 26) has the same natural frequency of vibration as the frequency of vibration of the tube 10 transversely. In this way, energy which otherwise might be lost in a slight torsional forced vibration of the "support" is recovered or at least, energy loss is substantially minimized. Even where there is some forced torsional vibration imposed in the tube 17 and wires 19, 24 and 26, the amount of rotation is so very small that most of the energy is recovered. There is no sidewise deflection of the supports (tube 17 and wires 19, 24 and 26) since they are located at the "nodes" of the vibrating tube 10 and the vibratory motion of the tube 10 accordingly produces only rotation at these nodes, and no transverse movement occurs.

A pressure may be imposed on the interior of tube 10 as illustrated at arrow 29. When the pressure is increased this will increase the "stiffness" of the tube 10 and accordingly its frequency of vibration will be changed since the frequency of vibration is dependant upon mass and stiffness. Therefore, the frequency of vibration of tube 10 becomes a measure of the pressure applied to the tube.

The various supports 15, 16, 22 and 23 are all mounted on a common base 30 as shown in FIGURES 2A, 2B and 3 and are hence electrically connected together and are electrically connected to the tube 10. An electrical connection is made to the base 30 or to one of the supports, being illustrated in FIGURE 1 as the connection 31, from which a line L3 extends through junction 32, which is grounded, and then to junctions 34 and 35 and then to an output terminal 36. One pole of battery is connected to junction 34 and the other pole of the battery is connected through a resistor 38 to a junction 39 and from junction 39 a circuit extends via line L1 to one plate 41 of the driving and sensing circuit. As shown in FIGURE 3, the plate 41 is mounted on an insulator 42 which is in turn carried by a support 43 on the base 30. A companion plate 44 is mounted on an insulator 45 and support 46 which extends to another frame support 47, not illustrated. The two plates 41 and 44 are each slightly spaced from tube 10 and they are located one directly above the other at one end of the tube 10, and they are located so as to be midway from side to side between the edges of the tube 10, so as not to produce any torsional vibratory forces on the tube 10. A circuit extends via line L2 to junction 49. One terminal of the battery 50 is connected to the junction 35 and the other terminal is connected through resistor 51 to junction 49. From junction 39, a connection is made through capacitor 52 to the input terminal 54 of an amplifier 55 and from the output terminal 56 thereof a connection is made via capacitor 57 to the terminal 49. Terminal 49 is also connected to the output terminal 58.

Any transient vibration will move the tube 10 and in so doing the end portion 10E of the tube 10 is moved either more closely or farther away from the plate 41, and vice versa in respect to the plate 44. This produces a signal voltage on these plates, which is communicated via the condenser 52 to the amplifier 55 and via condenser 57 to the junction 49, and hence is taken back via line L2 to the plate 44 for producing a driving force. Force is maintained so long as the signal input is received, which is to say, as long as the tube 10 continues to flex in its original direction, and accordingly the tube 10 is drawn toward the plate 44, by continuing force imposed upon it by the signal received from junction 49, via line L2. However, as the tube 10 reaches its limit of flexure, and begins to spring back, an opposite signal effect is produced, and this provides a recession in the driving force, thereby permitting the end 10E of the tube to be relinquished from its flexed condition, and it accordingly vibrates oppositely in a direction towards the plate 41, until again reaching its limit of flexure in the opposite direction. Enough clearance is provided so that under no condition does the end 10E of the tube contact the plates 41 and 44 as the tube 10 vibrates. There is always an air space between the plates 41 and 44 and the adjacent faces of the tube 10. The circuit shown in FIGURE 1 will produce the necessary input driving force to sustain the vibration of the tube.

An alternating current signal is produced at post 36 and 58 and may be read as a frequency indication, by any known frequency responsive read-out device.

The circuit shown in FIGURE 1 is exemplary. There are many power circuits which could be used.

Figure 23A:
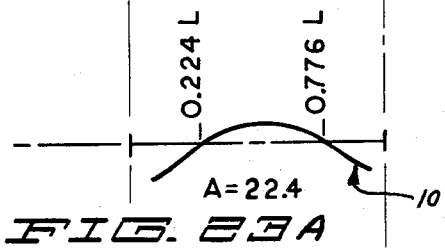
Figure 23B:
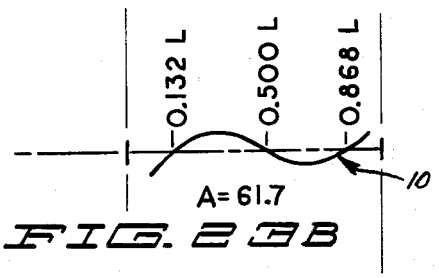

Reference is now made to FIGURES 23A through 23D which illustrate several nodes of vibration of the tube 10. In each of these figures the tube 10 is illustrated as a thick line but it will be understood that these figures show the side edge 10E of the tube, which may, for example, be as shown in FIGURES 1–3 or FIGURES 4, 5, 6, 7 or FIGURES 8A and 8B. The tube 10 is always closed at the ends and is either provided with a pressure inlet tube as in FIGURES 1–3, 4, 5, 6 and 7 or it can be sealed off and pressure applied to the exterior of the tube as in FIGURES 8A and 8B. In all cases of FIGURES 23A–D the vibration is normal to a plane through the major axis of the cross-section of the tube. In FIGURE 23A, the tube 10 is shown as vibrating at its fundamental frequency whereas in FIGURE 23B the tube is vibrated at its second harmonic frequency, and in FIGURE 23C the tube 10 is vibrated at its third harmonic frequency and in FIGURE 23D at its fourth harmonic frequency. The positions of the nodes when the tube is thus vibrated at its fundamental or at one of its harmonic frequencies, will therefore vary. It is noted that a support at the center, i.e. at the position 0.500L from the end of the tube, would be suitable for a second harmonic vibration and a fourth harmonic vibration. When it is desired to vibrate a vibrating tube at something other than its fundamental frequency i.e. at one of its harmonic frequencies, a frequency filter is placed in the driving circuit, so that only the harmonic frequency is applied to the driving coils, plates, etc. for therefor imposing upon the tube forces corresponding to such harmonic frequency. In this way, the tube will vibrate at the chosen harmonic frequency and will not vibrate appreciably at the fundamental or some other harmonic frequency.

It will therefore be understood that the location of the support (or supports) at the nodes of vibration will be selected according to whether the vibrating tube is to be vibrated at its fundamental frequency or at some selected harmonic frequency.

In FIGURE 4 there is illustrated another embodiment of the invention similar to that shown in FIGURE 1 except that on opposite ends of the tube 10 there are provided weights 60 and 61. These weights are identical and are located symmetrically with respect to the middle longitudinal tube axis. The weights accordingly add mass to the tube and will influence the rate of vibration of the tube which is determined by the mass and stiffness factors of the tube. Otherwise, the construction and operation of the device shown in FIGURE 4 is the same as that shown in FIGURES 1–3.

In FIGURE 5 there is illustrated a vibrating tube 62 which has an elliptical (or one might call it a "lenticular") cross-section. This vibrating tube is supported at only one of its two "nodes" (for fundamental frequency) and at one edge only, by a capillary tube 64 mounted on frame 48 and positioned at one node line 65—65. No support is provided at the other node at line 66—66, since the lower end of the tube is suspended. The tube 62 is vibrated transversely in the direction of double arrow 67, and the nodes of vibration occur at the line 65—65 and 66—66. At one end of the tube, here illustrated as the upper end, there are mounted capacitor (driving) plates 68 and 69 which are fed from the two circuits L1 and L2. A ground circuit L3 is connected to support 48. These plates correspond to the plates 41 and 44 of the configuration shown in FIGURES 1–4. The tube 62 can be supplied with pressure via arrow 70 which communicates with capillary tube 64 which extends to the inside of the tube 62, and accordingly as the pressure varies on the inside of the tube 62 and changes the stiffness of tube 62, the natural frequency of vibration of the tube 62 will also vary. The operation of this device is the same as that described with reference to FIGURES 1–4.

In FIGURES 6 and 7 there is illustrated an embodiment of the invention which is similar in some respects to that shown in FIGURE 1 and in other respects similar to that shown in FIGURE 5. In this embodiment of the invention the vibration tube generally designated 70 is a flattened tube closed at each end, similar to that shown in FIGURE 1, however, it is set vertically and for the mounting there is provided a capillary tube 71 attached to a frame support 72, and aligned tensioning wire 74 attached to a screw 75 which threads through another frame support 73. By turning the screw 75, the wire 74 can be tensioned. The axially aligned tube 71 and wire 74 correspond to tube 17 and wire 19 of FIGURES 1–3 and are located at a node of vibration for the tube 70. As previously stated, the axis of the wire 74 and tube 71 is in the median plane through the principal axis of the cross-section of tube 70, and the position of the support line 74 and tube 75, dimensionally from the upper end of the tube 70 is dependent upon whether the tube 70 is vibrated in its fundamental or some harmonic frequency, as previously explained. Its position is therefore at an upper node 76. The lower node 77 can be unsupported except to be generally restrained between points or knife edges as described below. The main frame 78 has upstanding frame pieces 79 and 80 thereon. In each of these there is provided an insulator as at 81 and 82 for receiving and supporting the condenser drive plates 41 and 44, corresponding to the device shown in FIGURES 1–3. These same supports 79 and 80 serve to receive the screws 84 and 85 which are threaded through the supports and locked by means of lock nuts 86 and 87. The screws 84 and 85 are blunt pointed, and are adjusted so as to be close to the opposite faces of the vibrating tube 70 at the lower node point 77. They serve generally to locate tube 70. The wiring connections L1 and L2 are made respectively to the plates 41 and 44 and ground wire L3 is connected to instrument frame piece 72 and through it to tube 70. The wiring L1, L2 and L3 are connected as shown in FIGURE 1. The motoring and read-out circuit and operation are the same as shown in FIGURE 1.

In FIGURES 8A and 8B, there is illustrated a form of the invention which is very similar to that shown in FIGURE 1 except that for applying pressure to the tube 10, tube 10 is completely sealed tight, and the tube 10 is then placed inside a pressure tight container 90 to which a pressure connection 91 is then provided. Pressure is thereby applied to the outside of tube 10. This involves the substitution of a wire support at 17A in place of the capillary tube 17, but otherwise the construction is the same as that shown in FIGURE 1 and the driving and read-out circuits are the same. Thus pressure applied via arrow 92 to connection 91 will be imposed on the exterior surface of the tube 10, and will cause its sides to deflect inwardly, thereby varying the stiffness of the tube, also a vacuum or partial vacuum may be applied to the tube 91 and a charge of gas (if contained) within the tube 10 will thereby produce a differential pressure which will expand and change the stiffness. Similarly, if the tube is supplied with a charge of gas and is sealed off, and is then subjected to a constant outside pressure and to variations in temperature the sealed off charge of gas will expand or contract thereby providing a differential pressure to change the stiffness of the tube, which is then a "temperature" indicator. The circuitry L1, L2 and L3 are connected as shown in FIGURE 8B, and correspond with the similar connections as shown in FIGURE 1.

In FIGURES 9 and 10 there is illustrated a tuning fork made of magnetic material, and constructed so as to have a hollow stem 94 which is attached to a frame support 95. The hollow stem extends down to the point 96 which is the node, and then branches into parallel tubular tines 97 and 98 which are closed at free ends 97A and 98A. The application of pressure or vacuum via the arrow 99 will cause the stiffness of the tubular tines of the tuning fork to vary. In this instance, the parallel tines 97 and 98 are joined at the position 96, which forms a node at the position 96, along the lines 96A—96A when the tines vibrate. The two tuning fork tines 97 and 98 simultaneously vibrate toward or away from each other as shown by the full arrows and dotted arrows in FIGURE 9. The motoring and read-out device is here composed of a coil 100, having terminal 106 and leads 103 and 115. When energized, coil 100 attracts the tines 97 and 98. Any suitable feed-back oscillator such as that shown in FIGURE 12, may be used for supplying the power source to terminal 106 and the lines 103 and 115. This is described below. The frequency of oscillation is read-out by any suitable frequency responsive device.

In FIGURE 11 there is shown a modification of the device shown in FIGURES 9 and 10 except that in this instance the tube is sealed and is filled with a charge of gas, such as nitrogen, helium or the like and the two tines 97 and 98 are connected together by a U-shaped portion 101, and at the center line 101A—101A. The entire device, as shown in FIGURE 11 can be used as a temperature indicator, or if desired, it may be enclosed in a pressure housing as provided in FIGURES 8A and 8B, for thereby varying the pressure applied to the outside of the tube. Nodes of the vibrating device shown in FIGURE 11 will occur at the lines 101A—101A, and the device is accordingly supported at these nodes on the knife edges 102. A second knife edge 104 may be used at each node to hold the tube 97–101–98 in place on knife edges 102. Any suitable framework may be used to support the knife edges 102 and 104, so that they gently engage opposite surfaces of the tube. It is preferred to mount the device so that it hangs on knife edges 102, as shown.

The tube portions 97 and 98 are of course viewed from their "thin" edge corresponding to edge 10E of the tube 10 of FIGURE 1. It is noted that the cross-sectional shape of the tubular tines is as illustrated in FIGURE 10, illustrates the cross-sectional shape of the tubes 97 and 98 for both FIGURE 9 and FIGURE 11. The same form of motoring device and read-out circuit can be used in the device of FIGURES 9–10 and that shown in FIGURE 11. A suitable form of circuit is shown in FIGURE 12.

In FIGURE 12, a battery 105 is connected to junction 106 from which a circuit extends through the phase-sensing coil 107 and thence to junction 108 from which the circuit extends through the resistance-capacitance bias network consisting of resistor 109 and capacitance 110 in parallel and thence from junction 111 a circuit extends to the base terminal B of the transistor 112. The transistor also has an emitter terminal E and a collector terminal C. From the emitter terminal E a circuit extends via line 114 to the positive pole of the battery 105. From the collector terminal C a circuit extends via line 115 to the driving coil 100, the opposite terminal of which is connected back to the junction 106. The driving coil 100 and phase sensing coil 107 and a read-out coil 116 are wound together coaxially. Coils 100 and 107 are connected via terminal 106 and via lines 103 and 115, as shown in FIGURES 9–12. A read-out coil 116 having terminals T1 and T2 is also provided and may be wound together with coils 100 and 107. The coil 116 is for providing a signal to the read-out circuit, which can be any frequency responsive or indicating circuit. The circuit of FIGURE 12 is generally known in Patent No. 2,971,323, except for the read-out of coil 116.

The embodiments of the invention so far described are tubes or forks which vibrate transversely to a plane through the principal axis of the tube cross-section. In the further embodiments of the invention shown in FIGURES 15–28 inclusive, the tubes are vibrated torsionally.

Thus referring to FIGURES 13 and 14, there is illustrated a tube 120 which is noncircular cross-section, and might for example be of precisely the same configuration as that shown at 10 in FIGURE 1. The tube is closed at each end, and is supported at a transverse nodular plane which (for the torsional vibration) is at the midpoint of such a tube and normal to the longitudinal axis of the tube. When the tube is vibrated torsionally as illustrated by the full line arrows 121—121 and the dotted line arrows 122—122, such torsional vibration produces a node at the nodular plane which is normal to the length of the tube 120 and midway between its ends. This plane is illustrated by the plane shown by the dotted lines 124. A support for the tube 120 can be made to any point where this nodular plane intersects the tube. When the tube 120 is vibrated torsionally according to the arrows 121 and 122, every particle of matter constituting the tube 120 which lies in the nodular plane 124 will remain at rest, whereas all other particles of matter constituting the tube wall, will vibrate in rotation about the axially centerline of the tube at 125—125. By placing the connection of the support 126 and tube 120 in the nodular plane 124 (or substantially in such plane) the vibration energy loss at the support will be made as low as possible.

Accordingly, for supporting the tube there is provided a post 126, which in this case is in the form of a tube communicating with the interior of the tube 120 although it could be simply a post, and the tube 126 may accordingly be supplied with pressure via the arrow 127, and this will vary the pressure within the tube 120. If post 126 is not a tube, then tube 120 is sealed and the whole device is placed in a container as in FIGURES 8A and 8B.

The tube 126 is at the intersection of the line 125 and the plane 124, at exactly the center of the tube 120 from end to end. It is not essential that the tube 126 join the tube 120 at the side-to-side center of the tube 120, and in some instances, it is desirable to have the tube 126 enter the tube 120 in a direction such as the direction of line 128, see FIGURES 15 and 16, for example.

For powering the tube 120 there are provided two capacitor plates 41 and 44 which are supplied by lines L1 and L2 respectively, and a ground connection is also made at L3 for grounding the tube 120 and the frame of the device. The circuit is as described with reference to FIGURE 1. However, in this case, the two condensor plates 41 and 44 are positioned to one side of the center line 125—125 and they accordingly cause a torsional force to be applied to the tube 120, thereby rotating it in the direction of arrows 121 and 122.

Referring to FIGURES 15 and 16, there is illustrated another embodiment of the invention wherein the tube 120 is precisely the same as that shown in FIGURES 13 and 14, except that in this instance the support and pressure entrance tube 126 is made to coincide with the transverse axis 128—128, at the exact center of the tube (plane 124, FIGURE 13). This tube is supported by a frame mounting 130. The plates 41 and 44 are mounted as described with reference to FIGURES 13 and 14 and they are similarly powered.

In FIGURE 17 there is shown a further embodiment of the invention wherein a torsionally vibrated tube 120 similar to that shown in FIGURES 13 through 15 is in this instance not provided with a capillary tube inlet, but is supported by two wires 131L and 131R which are attached to the opposite thin sides of the tube 120 at the plane 124 and tension is applied so as to be along the axis 128—128 which is the nodular axis in the plane 124. The wire 131L is attached to a frame boss 132L and the wire 131R is attached to a screw 134 which passes through another frame boss 132R. The screw has a lock nut 134N on it and when it is tightened the two wires 131R and 131L are tensioned. The tube 120 is in effect balanced on the wires 131L–131R. The entire system is enclosed in a pressure tight container 135 which has a pressure inlet 136 to which pressure or vacuum may be applied via the arrow 137. The driving condensor plate 44, illustrated as connected to line L2 has a corresponding lower drive plate 41 (not shown) located immediately below it, as shown in FIGURES 15 and 16, and previously described. The energizing and read-out circuits and the powering circuits are exactly the same as described with reference to FIGURES 13–14 and 15–16. When pressure or vacuum are applied to the tube 136, this will deflect the walls of tube 120 and accordingly change its stiffness and change its frequency.

Referring to FIGURES 18, 19 and 20 in this form of the invention there is illustrated a torsionally vibratable tube 120 which can be the same as shown in FIGURES 13–14 or 15–16 or FIGURE 17, except that in this instance at one end of the tube there is provided a crosswise extending "dumbbell weight" 138 and at the other end there is provided an identical "dumbbell weight" 139. The sealed ends 120S of the tube 120 occur as shown, and the dumbbell weights 138 and 139 act like vanes extending sidewise from these sealed ends. Otherwise, the tube 120 has a mounting post, which is in the form of a capillary tube 126 which extends through the base plate of the machine and may be provided with pressure or vacuum via the arrow 127. This is similar to FIGURES 13 and 14. Also, the location of the driving condensor plates 41 and 44 as in FIGURES 18–20 is moved out to the end of one of the dumbbell vanes 138 or 139 which are of conductive material. In this instance it is shown at one end of the vane 139. These plates 41 and 44 are connected to the circuits L1 and L2 as previously described in the tube 120, vane 138 and 139 and frame are grounded by the connection to circuit L3. Vibration is induced and the frequency is read-out as previously described. By suitable selection of the material used for making the vanes 138 and 139, compensation for some or all of the temperature error may be achieved. Thus by making the vanes 138 and 139 of a different metal than the metal used for making the tube 120, it is possible to change the length of the dumbbell vanies 138–139 more rapidly or less rapidly than the dimension of the tube 120 is changed, and to achieve a degree of compensation for temperature which would otherwise not be obtainable.

In FIGURE 21, there is illustrated a vibrating tube 140 which may be considered the same as that in 120 in the previously described embodiments of the invention, except that the tube 140 is somewhat eliptical in cross-section. It is also provided with a mounting post at 141, but this reaches down to a reservoir 142 which has a diaphragm 144 across it, the diaphragm being closed by the housing 145 which is served by the inlet tube 146. Pressure or vacuum may be applied via the arrow 147. The entire space within the tube 140, tube 141 and reservoir 142, down to the diaphragm 144, is filled with a liquid such as oil. The tube 140 is provided with driving plates 41 and 44 served by the lines L1 and L2 respectively, and a ground connection is made via line L3 to the tube 140 and frame of the instrument. The tube 140 is of course closed at each end, as described with reference to tube 120.

In FIGURE 22, there is illustrated another form of driver suitable for moderate frequencies wherein the tube such as the tube 120 or 140 is of magnetic material and is suitably mounted by a mounting post for torsional vibration. Then offside with respect to the longitudinal center line of the tube and at one end thereof, there is provided a magnetic core 150, having polepieces 151 and 152 shaped so as to conform rather closely to the proximate faces of the tube 120. The suitable coil is placed around this core, and is powered by lines extending from the power circuit, as described with reference to FIGURE 12. The coil will, of course, include separate coils 100, 107 and 116, and suitable terminals are provided for each, as described with reference to FIGURES 9–12.

In FIGURES 24–27 there is illustrated an embodiment of the invention suitable when the vibratory tube is made of quartz. Thus there is shown in these figures a tube generally designated 200 of quartz. This tube is of eliptical shape and has a very thick wall at W and it is closed at both ends. Midway between the ends of the tube there is introduced a pressure inlet tube 201, which can enter at any direction radially with respect to the long axis of the tube at the nodular plane (plane 201A, FIGURE 26). It is preferred to introduce the tube 201 so that it coincides with the long axis of the cross-section of the tube 200 although this is not essential. On the outer surface of the tube 200 there are plated-on areas 202, 203, 204 and 205. These plated-on areas 202–205 are shown very much exaggerated in thickness in the drawings, but it will be understood that they are very thin metal coatings which are plated on the outside of the tube 200 and do not effectively increase the dimensions of the tube 200. The tube 200 is made from a single crystal and it is made so that its length in the direction of line 206—206 corresponds with the X-axis of the quartz crystal. The plated-on electrodes 202, 203, 204 and 205 are located around the periphery of the tube so as to leave uncoated areas 207, 208, 209 and 210 between the edges of these plated-on and electrically conductive areas, and these terminals are located so that the Y-axis and the Z-axis of the quartz crystal will pass through the uncoated areas between the edges of the terminals. From the oppositely positioned terminals 202 and 204, circuits extend via lines 210 and 211 to the junction 212 from which a circuit extends via line 213 to junction 214 and thence to the plate 215 of an electron tube 216. From the opposite pair of terminals 203 and 205 circuits extend via lines 217 and 218 respectively to the junction 219 and thence via line 220 to the junction 221. A circuit extends via line 222 to the grid 224 of the tube 216. From junction 221 a circuit extends via resistor 225 to junctions 226 and another circuit extends through variable condensor 227 which is also connected to junction 226. From junction 226 the circuit extends via line 228 to junction 229 and thence to junction 230 which is connected to ground G. From junctions 229 a circuit extends via condensor 231 to junction 232. Resistor 234 is connected between the junctions 230 and 232, and junction 232 is connected to the emitter 235 of the tube 216, the emitter also being connected to the screen grid 236. A second grid 237 is connected back to junction 238 from which a circuit extends via resistor 239 to ground junction 230. From junction 238, a circuit extends via condensor 240 to junction 241 and thence to ground G and from junction 241 a circuit extends via the condensor 242 to junction 243 which is connected to a B+ power source. From junction 238 a circuit extends via resistor 244 to junction 245 from which a circuit extends via inductance 246 to junction 247 from which a circuit extends through condensor 248 to the readout terminal 249, the other read-out terminal being ground G. Junction 247 is connected via line 250 to junction 214.

This circuit, which is known as a Pierce oscillator, is well known and may be used for applying the oscillatory energy to the plated-on teminals of the tube 200, for producing in them a piezo-electric effect for vibrating the crystal. There are many other well known oscillator circuits that may be used in lieu of the Pierce oscillator for the purposes of this invention. By changing the amount of pressure applied to the tube 201 and hence to the interior of the quartz tube 200, the frequency of the quartz tube 200 can be changed as previously described. It is apparent that the quartz tube 200 may be entirely sealed off with a charge of gas therein, and differential pressure can then be applied to the tube 200 by varying the amount of pressure applied to the exterior thereof, as in FIGURES 8A and 8B.

FIGURE 28 illustrates a form of the invention utilizing torsional vibration and which may be advantageously utilized in many situations. When the vibrating tube of the present invention is vibrated torsionally, it has been pointed out that those portions of the tube which are situated in the nodular plane 124, 201A will not move during such torsional vibration, and hence a physical connection is made to such torsionally vibrating tube at such nodular plane, will not appreciably drain away vibratory energy. The several embodiments of the invention involving torsional vibration, so far mentioned in this specification, have utilized mountings which are located in, or substantially in such nodular plane. In addition, the torsionally vibrating tubes present two additional nodular points which can be used individually or together, as advantageous locations for attaching the physical support to the torsionally vibrating tube. Such nodular points are defined by the intersection of the central longitudinal axis of the tube with the endwalls of the tube. The torsional vibration of the tube is a rotational oscillation about the torsional rotational axis, i.e. the central longitudinal axis of the tube. At this axis of the tube there is, at least theoretically, no motion whatever. Hence, an attachment made to the endwal's of the torsionally vibrating tube, at the intersection of torsional rotational axis, i.e. the central longitudinal axis of such tube and the endwalls of the tube, will not be subjected to any rotation. This is one geometric point on each endwall. Of course, it is physically impossible to make any support device so small that its attachment would be only a theoretical point, but this is the desideratum and hence any attachment which is made coaxial with said central longitudinal axis of the torsionally vibrating tube and if the attachment is itself kept quite small will be rotationally oscillated about the theoretical point and will consume little or no energy. The attachment, such as a wire, wi l thus be subjected to a twisting oscillation and since such support (such as a wire) can, itself, be elastic and may be "tuned" this will return some of the energy which is taken into the support, back to the vibrating system.

FIGURE 28 illustrates such an embodiment of the invention. In it a mounting for the torsionally vibrating tube is provided coaxially with respect to the axis of torsional vibration tube. In FIGURE 28, the tube 260 is similar to that shown at 120 or 140 previously referred to. The closed ends 261 and 262 of tube 26 are intersected by the line 264, which is the axis of torsional vibration, and which in a tube of uniform section is the central longitudinal axis of the tube. The intersection of such axis with ends 261 and 262 thereby provides the points 265 and 266 which are locations for attaching the supports. In FIGURE 28 two supports are used, either of which may be eliminated if the tube 260 is hung vertically by one of them. Accordingly, there is in FIGURE 28 provided a supporting wire 266 at one end of the tube 260, this wire being welded or otherwise mechanically attached at the locational point 265. This wire extends to the frame piece 267, to which it is also attached. The wire 266 may be provided with a tensioning device, as described, for example, with reference to wires 19 and 26 in FIGURES 2A–2B. At the opposite end of the tube 260, the end 261 is provided with an aperture and to this aperture there is attached a small capillary tube 268, which is shown much exaggerated in size in FIG- URE 28. This tube 268 is hermetically attached to the end wall 261 and communicates with the interior of the tube 260. The tube 268 passes through a suitable aperture in the frame piece 269 and at the outer end of the tube 268 a pressure connection can be made which thereby communicates the pressure to the interior of the tube 260. The plates 41 and 44 to which line L2 and L1 respectively are attached, are provided at one side of the center line 264 at one end of tube 260, in a manner similar to that shown in FIGURE 21. The line L3 is attached to the block 299. These plates, when suitably energized, provide the torsional vibratory energy input and frequency sensing as previously described. As a result of the energy input, the tube 260 will be subject to torsional vibration as illustrated by the solid arrows 270 and the dotted arrows 271. If desired, the length of the wire 260 and the capillary tube 268 can be made such as to have the same period of vibration as that of the tube 260 and will, at least theoretically, return to the vibrating system substantially all of the energy due to the torsional vibration in the support 266–268. If desired, a wire may be substituted for the tube 268, and the end 261 made solid. Or the tube 268 may simply be sealed off after having evacuated the tube 260 or placed a charge of gas therein. When this is done pressure or vacuum is applied to the exterior of the tube 260, as illustrated in FIGURES 8A–8B.

In FIGURES 29–31 there is illustrated a form of invention using a transverse vibratory tube, generally designated at 300, which is supported at its nodular points (or planes) 301 and 302 by means of a thin diaphragm gas tight 303 and 304. These diaphragms are attached gas tight to tube 300 at the planes 301 and 302 and have their peripheries attached to, respectively, the edges 305 and 306 of apertures in opposite ends of a box-like container 307, which has a pressure connection 308. As a result that portion of tube 300 which is between the diaphragm 303 and 304 can be subjected to an exterior pressure or vacuum as desired, and the configuration of this portion of the tube may be thereby changed, hence effecting its stiffness. The motoring and read-out plates 41 and 44 are provided at one end of the tube 300 and are supplied with energy by the line L1 and L2 respectively, it being noted that the container itelf is connected to line L3. The motoring and read-out circuit operating as previously described produces a transverse vibration in the tube as shown by the double arrow 310, about the nodular planes defined by the diaphragm 303 and 304 and the vibration is sensed. Pressure or vacuum applied via the connection 308 will change the rate of vibration which is accordingly read-out by any suitable circuit as previously mentioned.

In each of the embodiments of the invention the power system is a feed-back oscillator system which is associated with the vibrating tube so as to vibrate the tube at a natural frequency of oscillation of the tube, whether such frequency be the fundamental frequency or a harmonic frequency. The initial or starting oscillation may be induced mechanically or in the feed-back oscillator system, and thereafter will be substained by the energy input of the feed-back oscillator power source. The amplitude of oscillation of the vibrating tube quickly increases up to the maximum for the system and is thereafter sustained at the maximum by the energy fed in by the oscillator.

The devices of the present invention may be utilized for the measurement of temperature or pressure or may be used as a frequency standard or indicator. When used for the measurement of temperature the vibratory tube contains a charge of gas and is sealed. Gases such as nitrogen, helium or other gas which remains in a gaseous condition over a wide range of temperature may be used. The entire device is then subjected to selected stable temperature conditions for calibration. At each selected temperature the charge of gas contained within the tube will attain a certain pressure which manifests itself as a certain stiffness of the tube which in turn is manifest as a certain natural frequency of vibration of the tube. Thus a frequency read-out as the ultimate signal, may be calibrated as temperature. By selecting a sufficient number of calibration points, full range calibration is attained.

The same device may be used as a temperature standard by subjecting the whole device to variable controllable temperature. As a certain temperature is established by the environmental conditions, this produces certain pressures within the sealed vibratory tube and consequently at a given but unknown temperature there will be a certain output frequency, which is thereby an indication of the temperature being attained. The frequency output is a check on the environmental conditions and other temperature sensing devices may then be calibrated against this frequency.

As a pressure sensing instrument, the pressure is applied either to the inside or to the outside of the tube, according to the various embodiments herein described. The signal produced is a frequency signal, which is accordingly calibrated as a pressure indication, against a known pressure standard. Once calibrated, the device may be used independently as a pressure sensing instrument.

By sealing the vibratory tube with a certain content of gas in it and subjecting the whole device to a constant environmental pressure there is accordingly produced a certain pressure within the tube and as a consequence a certain stiffness for the tube, which is accordingly read-out as a frequency indication. The device may thus be used as a frequency standard.

The amount of gas sealed within the tube (or alternately in a chamber enclosing an evacuated tube) may be selected so as to provide compensation, at a predetermined (design) frequency for changing temperature conditions. The tube stiffness may be made to vary by way of temperature effects on the sealed fluid sample in the opposite sense and magnitude of other temperature sensitive characteristics of the tube such as dimensional and elastic modulus characteristics. In this manner by appropriate selection of the amount of gas that is sealed in the tube, compensation of undesirable temperature effects, which always to some extent occur, may be minimized or eliminated.

Thus, for example the problem may be to provide a frequency standard. Most vibrating devices change "frequency" due to changes in temperature and to achieve a "constant frequency," which is the object of a "standard," it has been common, heretofore, to place the standard (which might, for example, be a quartz crystal) in a small "oven" in which the temperature is closely controlled.

According to this invention a frequency standard may be provided which in itself compensates for temperature variations. This is done by using a sealed vibrating tube, and a carefully adjusted quantity of fluid (gas or liquid) may be placed within the sealed tube or within a container in which the sealed tube (which is then evacuated) is contained. Gas or liquid may be used inside the tube, but if the tube is evacuated, and the compensating fluid is applied to a container in which the vibrating tube is contained, then the fluid should be gas, since it has a much lesser damping effect than would liquids. When contained within the vibrating tube there will be some slight molecular friction in the fluid (gas or liquid) but essentially the fluid merely moves with the vibrating tube.

The effect of the fluid is to expand or contract with varying temperatures thus providing a variation in pressure within and hence variation in "stiffness" of the vibrating tube and this in turn effects the natural frequency of vibration of the tube. Now, this effect which, by having the fluid inside or outside the tube may be made either positive or negative in direction, may be used to compensate for other changes of frequency which inevitably occur in any frequency standard due to changes in dimension and changes in Young's Modulus, etc. and may be used to provide compensation to partially or entirely eliminate the need for temperature control of the environment in which the standard is used.

In other situations, the use of the fluid pressure effect (just described) on the stiffness of the tube, may also be used for precise production-control of the frequency of vibration of a vibrating tube assembly. Thus, in a production run there may be a slight variation in frequency between individual tubes of a given run. These variations would be difficult to control by changes based on physical dimensions. However, by varying the amount of the charge of gas (of fluid) inside or outside the tube, slight variations in frequency can be made in an individual device to bring its natural frequency to within a specified range for the run. The inlet tube is then sealed off, and the individual device is then ready to be used.

As many widely apparently different embodiments of this invention may be made without departing from the spirit and scope thereof, it is to be understood that I do not limit myself to the specific embodiments disclosed herein.

What is claimed is:

1. An instrument comprising a tube of noncircular cross-section, mounting means for said tube, said mounting means being oriented so as to support the tube at a node thereof occurring when the tube is vibrated, means for vibrating said tube, said tube being constructed so as to permit application of a differential pressure to at least a portion of the wall of the tube and means for connecting the tube to an electrical circuit responsive to the vibrations of the tube.

2. The instrument of claim 1 further characterized in that the tube is sealed at its ends and differential pressure is applied by means of a pressure communicating channel extending into the interior of the vibratory tube.

3. The instrument of claim 1 further characterized in that said vibratory tube is sealed and differential pressure is applied by means of a housing around the instrument said housing having an inlet thereinto for varying the pressure in said housing for varying the pressure on the exterior of the vibratory tube.

4. The instrument of claim 1 further characterized in that said vibratory tube is mounted for transverse vibration.

5. The instrument of claim 1 further characterized in that said vibratory tube is mounted for torsional vibration.

6. The instrument of claim 1 further characterized in that substantially identical masses are mounted at opposite ends of the vibratory tube.

7. The instrument of claim 6 further characterized in that said masses are elongated in a direction transverse to the length of the tube.

8. The instrument of claim 7 further characterized in that said vibratory tube and masses are composed of materials having different coefficients of expansion.

9. The instrument of claim 1 further characterized in that said vibratory tube is centrally curved transversely in respect to said longitudinal axis so as to locate the ends of said tube in juxtaposition.

10. The instrument of claim 1 further characterized in that said mounting means comprises a support connected to the vibratory tube extending therefrom and normal to the length of the vibratory tube.

11. The instrument of claim 10 further characterized in that said support is a capillary tube communicating with the interior of the vibratory tube.

12. The instrument of claim 1 further characterized in that said mounting means is connected to the vibrating tube at the major longitudinal axis thereof and said tube is vibrated torsionally.

13. The instrument of claim 12 further characterized in that said mounting means comprises aligned tension members at opposite ends of the vibrating tube along the major longitudinal axis thereof.

14. The instrument of claim 13 further characterized in that one of said aligned tension members is a capillary tube extending into said vibrating tube.

15. The instrument of claim 1 further characterized in that said mounting means comprises aligned tension members extending from opposite sides of the tube in said longitudinal axis and normal to the length of the tube, said aligned members being anchored to frame supports and provided with means for tensioning them.

16. The instrument of claim 15 further characterized in that one of said aligned tension members is a capillary tube communicating with the interior of the vibratory tube.

17. The instrument of claim 15 further characterized in that said aligned tension members are provided at each of the two nodes of the vibrating tube which occur when the vibrating tube is vibrated transversely at its fundamental frequency.

18. The instrument of claim 15 further characterized in that said aligned tension members are provided midway along the length of the vibrating tube when it is vibrated torsionally.

19. The instrument of claim 1 further characterized in that a feed-back oscillator system is associated with the vibratory tube to vibrate it transversely to said longitudinal plane.

20. The instrument of claim 1 further characterized in that a feed-back oscillator system is provided associated with the vibratory tube to vibrate it torsionally about a longitudinal axis through said tube.

21. The instrument of claim 1 further characterized in that said vibratory tube has a feed-back oscillator associated therewith and is vibrated by energy transferred capacitatively from the feed-back oscillator.

22. The instrument of claim 1 further characterized in that said vibratory tube has a feed-back oscillator associated therewith and is vibrated by energy transferred magnetically from the feed-back oscillator.

23. The instrument of claim 1 further characterized in that vibratory tube has a feed-back oscillator associated therewith and is vibrated by energy transferred piezoelectrically from said feed-back oscillator.

24. The instrument of claim 1 further characterized in that said vibratory tube is of composed materials selected from the class consisting of metals, silicon, germanium and quartz.

25. The instrument of claim 1 further characterized in that said vibratory tube is composed of quartz crystal, the longitudinal axis of the tube coinciding with the X-axis of the quartz crystal, said tube having four peripherally spaced longitudinal conductive areas on the exterior of the tube, said areas being of a peripheral dimension and so located that the Y and Z axes of the quartz crystal pass through the spaces between the edges of said areas, said feed-back oscillator being connected to said conductive areas for piezoelectrically vibrating said tube.

26. The instrument of claim 1 further characterized in that the vibrating tube is open at the ends and is vibrated transversely and has a housing around it for applying pressure to that portion of the tube between the two endmost nodes developed as it vibrates, said housing including a flexible wall connected to the vibrating tube at each of said endmost nodes.

References Cited by the Examiner

UNITED STATES PATENTS

| 2,466,809 | 4/1949 | Hobbs | 73—398 |
|---|---|---|---|
| 2,635,462 | 4/1953 | Poole et al. | 73—32 |
| 2,943,476 | 7/1960 | Bernstein | 73—32 |
| 2,956,431 | 10/1960 | Westerheim | 73—32 |

LOUIS R. PRINCE, *Primary Examiner.*

J. KOMINSKI, *Examiner.*